US006751078B1

(12) United States Patent
Munakata et al.

(10) Patent No.: US 6,751,078 B1
(45) Date of Patent: Jun. 15, 2004

(54) POWER USE CIRCUIT BREAKER AND ELECTRICAL CIRCUIT ARRANGEMENT FOR ELECTRIC POWER GENERATION PLANT

(75) Inventors: Noriaki Munakata, Juo-machi (JP); Yukio Kurosawa, Hitachi (JP); Haruo Honda, Hitachi (JP); Shigetoshi Oouchi, Hitachi (JP); Masaki Shinohara, Hitachinaka (JP)

(73) Assignees: Hitachi, Ltd., Tokyo (JP); Hitachi Electric Systems Co., Ltd., Ibaraki (JP)

( * ) Notice: Subject to any disclaimer, the term of this patent is extended or adjusted under 35 U.S.C. 154(b) by 350 days.

(21) Appl. No.: 09/637,497

(22) Filed: Aug. 11, 2000

(30) Foreign Application Priority Data

Jan. 11, 2000 (JP) ...................................... 2000-006198

(51) Int. Cl.$^{7}$ ................................................ H02H 9/00
(52) U.S. Cl. ........................................ 361/58; 361/115
(58) Field of Search ................................... 361/58, 115

(56) References Cited

U.S. PATENT DOCUMENTS 3,577,032 A * 5/1971 McStrack et al. ........... 313/156
3,912,975 A * 10/1975 Knauer et al. ................ 361/58
4,104,496 A * 8/1978 Koike et al. ................ 218/119
4,305,107 A * 12/1981 Murano et al. ................ 361/4
4,547,769 A * 10/1985 Tanigaki et al. ............ 340/605
4,594,630 A * 6/1986 Rabinowitz et al. . 174/DIG. 17
4,814,559 A 3/1989 Stegmuller
5,214,557 A * 5/1993 Hasegawa et al. ............ 361/11
5,640,060 A * 6/1997 Dickson ...................... 307/87
5,650,901 A * 7/1997 Yamamoto .................. 361/100
5,737,160 A * 4/1998 Duffy ............................ 361/3
6,141,192 A * 10/2000 Garzon .......................... 361/5

OTHER PUBLICATIONS

Driescher Panickker, Publication for Vacuum Circuit breaker/Principles of Vacuum Circuit Breaker, Oct. 8, 2000.*

* cited by examiner

*Primary Examiner*—Brian Sircus
*Assistant Examiner*—Isabel Rodriguez
(74) *Attorney, Agent, or Firm*—Mattingly, Stanger & Malur, P.C.

(57) ABSTRACT

A power use circuit breaker includes an arc generating switching unit which adds an electrical resistance in a circuit during current interruption to attenuate a current to be interrupted, a vacuum bulb which is electrically connected in series with the arc generating switching unit and interrupts the attenuated current and a current conducting switching unit connected in parallel with the series circuit of the vacuum bulb and the arc generating switching unit. For current conduction the current conducting switching unit is closed after the vacuum bulb and the arc generating switching unit are closed, and for current interruption after opening the current conducting switching unit, the vacuum bulb and the arc generating switching unit are opened.

5 Claims, 5 Drawing Sheets

POWER USE CIRCUIT BREAKER AND ELECTRICAL CIRCUIT ARRANGEMENT FOR ELECTRIC POWER GENERATION PLANT

BACKGROUND OF THE INVENTION

1. Field of the Invention

The present invention relates to a power use circuit breaker and an electrical circuit arrangement for an electrical power generating plant using such power use circuit breaker.

2. Conventional Art

A power use circuit breaker, which interrupts a fault current flowing at a time of electric power system accident and protects the electric power system, is required to instantly interrupt a large fault current. In particular, a power use circuit breaker disposed between an electric power generator and a main power transformer, which is opened and closed at the time of starting and stopping of the electric power generator and further interrupts a large power generator fault current flowing at the time of accident, is required to have a capacity of interrupting a large current from several ten thousand to several hundred thousand amperes (A) containing a DC component.

A power use circuit breaker such as a puffer type gas circuit breaker and a vacuum circuit breaker which have been used to interrupt such large current has the following drawbacks.

(a) Puffer Type Gas Circuit Breaker

It is required a gas pressure of more than several hundred thousand atmospheric pressure which is to be blasted to a large current arc generated between contacts during current interruption to extinguish the arc for interrupting current of several ten thousand amperes, therefore, if a bellows having an operating stroke of 100~300 mm in order to obtain the above high pressure gas, an operating force of about hundred thousand-several tens of tons is required which increases the size of the machine.

(b) Vacuum Circuit Breaker

When interrupting a current containing a DC current component with a vacuum circuit breaker, it is impossible to attenuate the DC current component by making use of an arc resistance, because an arc voltage generated between contacts in the vacuum circuit breaker during current interruption is low, therefore, it is difficult to apply a vacuum circuit breaker for interrupting current in an electric power generator main circuit containing a large DC current component. Further, since a current conducting capacity of a vacuum circuit breaker is small, it is difficult to use a vacuum circuit breaker in a circuit in which current more than 4000 A flows.

SUMMARY OF THE INVENTION

An object of the present invention is to provide a small sized power use circuit breaker which realizes current conduction and interruption of a large current containing a DC current component.

Another object of the present invention is to provide a small sized power use circuit breaker which surely performs current interruption of a large current containing a DC current component with a small operating force.

Still another object of the present invention is to provide an electric circuit arrangement for an electric power generating plant which permits a size reduction of the concerned house installation by making use of a small sized power use circuit breaker.

A power use circuit breaker according to the present invention which is connected in an electric circuit and operates to interrupt current flowing through the electric circuit, is characterized by being provided with an electrical resistance generating unit which adds an electrical resistance in the electric circuit during interruption of current and causes to attenuate current to be interrupted and a vacuum circuit breaker which is connected in electrically series with the electrical resistance generating unit and operates to interrupt the attenuated current.

Further, a power use circuit breaker according to the present invention including a current interrupting circuit which is connected in an electric circuit and operates to interrupt current flowing through the electric circuit and a current conducting circuit which is connected in parallel with the current interrupting circuit and is opened prior to the current interrupting circuit during interruption of current so as to transfer conducting current to the current interrupting circuit, is characterized in that the current interrupting circuit is provided with an electrical resistance generating unit which adds an electrical resistance in the electric circuit during interruption of current and causes to attenuate current to be interrupted and a vacuum circuit breaker which is connected in electrically series with the electrical resistance generating unit and operates to interrupt the attenuated current.

Further, it is characterized that the electrical resistance generating unit is an arc generating switching unit which is closed during current conduction to show a substantially negligible small value of electrical resistance and is opened during current interruption so as to generate an arc and to form an arc resistance circuit.

Further, it is characterized that the electrical resistance generating unit is provided with a container which contains gas of which pressure is raised by heating through arcing and the pressurized gas is blasted toward the arc.

Further, it is characterized that the current conducting circuit is provided with a current conducting switching unit, and the vacuum circuit breaker and the current conducting switching unit are coupled through an operating mechanism having a dead band with regard to operation stroke so as to open the vacuum circuit breaker after having opened the current conducting switching unit which permits an interlocked switching operation of the current conducting switching unit and the vacuum circuit breaker with a single driving unit.

Further, it is characterized in that the current conducting circuit is provided with a current conducting switching unit, and the vacuum circuit breaker, the arc generating switching unit and the current conducting switching unit are coupled through an operating mechanism having a dead band with regard to operation stroke so as to open the arc generating switching unit to generate an arc after having opened the current conducting switching unit and thereafter to open the vacuum circuit breaker which permits an interlocked switching operation of the current conducting switching unit, the arc generating switching unit and the vacuum circuit breaker with a single driving unit.

Further, it is characterized in that the current conducting switching unit and the arc generating switching unit are interlocked like a unitary body.

An electric circuit arrangement for an electric power generating plant according to the present invention, is characterized in that a power use circuit breaker according to one of those explained above is connected between an electric power generator and a main power transformer so as to permit separation of the main power transformer and a house transformer from the electric power generator.

DESCRIPTION OF THE EMBODIMENTS

Figure 1:
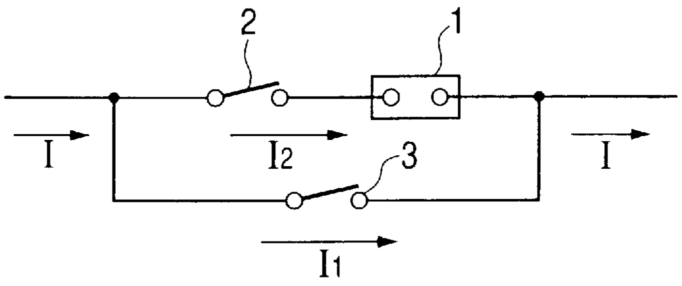
FIG. 1 is an electric circuit diagram representing an embodiment of power use circuit breaker according to the present invention.

FIG. 1 is an electrical circuit diagram of a power use circuit breaker representing an embodiment according to the present invention. A vacuum bulb (vacuum circuit breaker) 1 for a large current interruption is connected in series with an arc generating switching unit 2 for arc generation so as to constitute an interruption circuit therewith, and a current conducting or carrying switching unit 3 for a large current condition constituting current conduction circuit is connected in parallel with this series circuit.

The vacuum bulb 1 is provided with switching contacts which open and close in a vacuum.

The arc generating switching unit 2 is provided with switching contacts which causes an arc by opening the interruption circuit and adds in the interruption circuit an electric resistance due to the arc, and functions as an electric resistance generating unit.

Further, the current conducting switching unit 3 is provided with switching contacts having current conducting or carrying capacity of a rated current of the concerned power use circuit breaker, and constitutes so as to form the current conducting circuit connected in parallel with the interruption circuit and having a sufficiently small electric resistance which is substantially negligible with respect to the electric resistance of the interruption circuit formed by connecting the vacuum bulb 1 and the arc generating switching unit 2 in series.

When placing the thus constituted power use circuit breaker into a current conducting state, at first, the vacuum bulb 1 is closed, subsequently, the arc generating switching unit 2 is closed so as place the interruption circuit into a closed state, and thereafter, the current conducting switching unit 3 is closed so as to place the current conducting circuit into a closed state. In this current conducting state, although the respective contacts in the vacuum bulb 1 and the both switching units 2 and 3 are contacted to form a circuit closed state, current I primarily branches in the current conducting circuit constituted by the current conducting switching unit 3 and having a small electrical resistance and flows therethrough as current I1.

When a large fault current from several ten thousand to several hundred thousand amperes due to such as the power system accident flows, a detection device detects such fault current and issues a circuit open command to the concerned power use circuit breaker so as to open the power use circuit breaker and to interrupt the fault current. When receiving the circuit opening command, the power use circuit breaker separates the contacts of the current conducting switching unit 3 to open the current conducting circuit, thereby, transfers the fault current into the interruption circuit formed by connecting the vacuum bulb 1 and the arc generating switching unit 2 to cause to flow current I2 therethrough, and thereafter separates the contacts of the arc generating switching unit 2 to generate an arc between the contacts. The fault current containing a DC current component flows through the arc generated and is attenuated there by the electric resistance due to the arc.

After the fault current is fully attenuated, the contacts of the vacuum bulb 1 is separated to open the interruption circuit, thereby, the fault current is interrupted. Further, where the fault current is small, the arc is extinguished to interrupt the fault current, before the contacts of the vacuum bulb 1 are separated.

Figure 2:
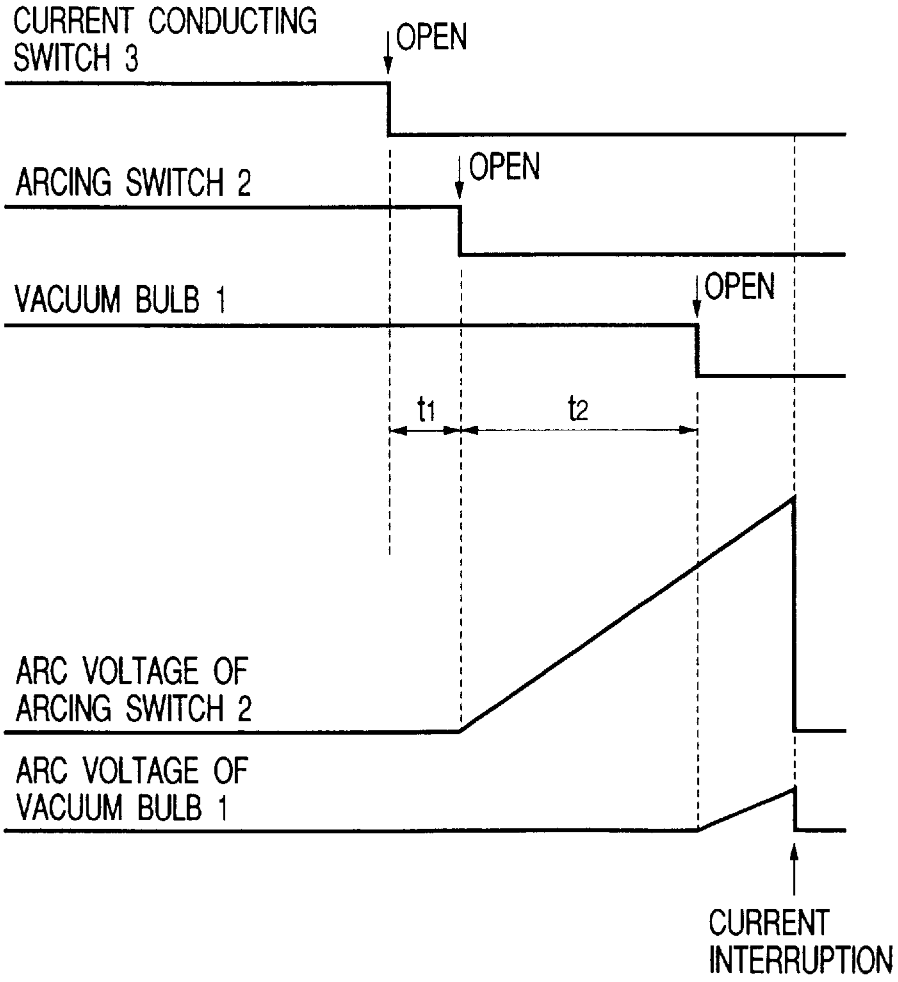
FIG. 2 is a time chart of a current interrupting operation in the power use circuit breaker as shown in FIG. 1.

FIG. 2 represents a time chart showing the above explained current interrupting operation. Time t1 after opening the current conducting switching unit 3 until opening the arc generating switching unit 2 and time t2 after opening the arc generating switching unit 2 until opening the vacuum bulb 1 are to be set properly according to the specification of the circuit breaker concerned.

In order to transfer a large fault current flowing through the current conducting circuit including the current conducting switching unit 3 with no arc into the interruption circuit including the vacuum bulb 1 and the arc generating switching unit 2, it is necessary to complete the current transference before the voltage of the arc which is generated by separating the contacts of the arc generating switching unit 2 is raised, through the provision of adding a resistance for attenuating the fault current by means of the arc generated in the arc generating switching unit 2, the transference of the fault current can be surely realized with no arc, because the arc voltage immediately after the contacts of the arc generating switching unit 2 are separated is low. After the current transference, the separation distance between the contacts of the arc generating switching unit 2 increases so as to increase the value of arc resistance, thereby, the generated arc acts effectively to attenuate the fault current.

If it is required to attenuate such a large fault current with a solid resistor, an extremely large sized resistor is necessitated, because of a need for a large current carrying capacity thereof. However, with the use of the arcing resistance a reduced size resistor can be constituted in a form of an arc generating switching unit.

Figure 3:
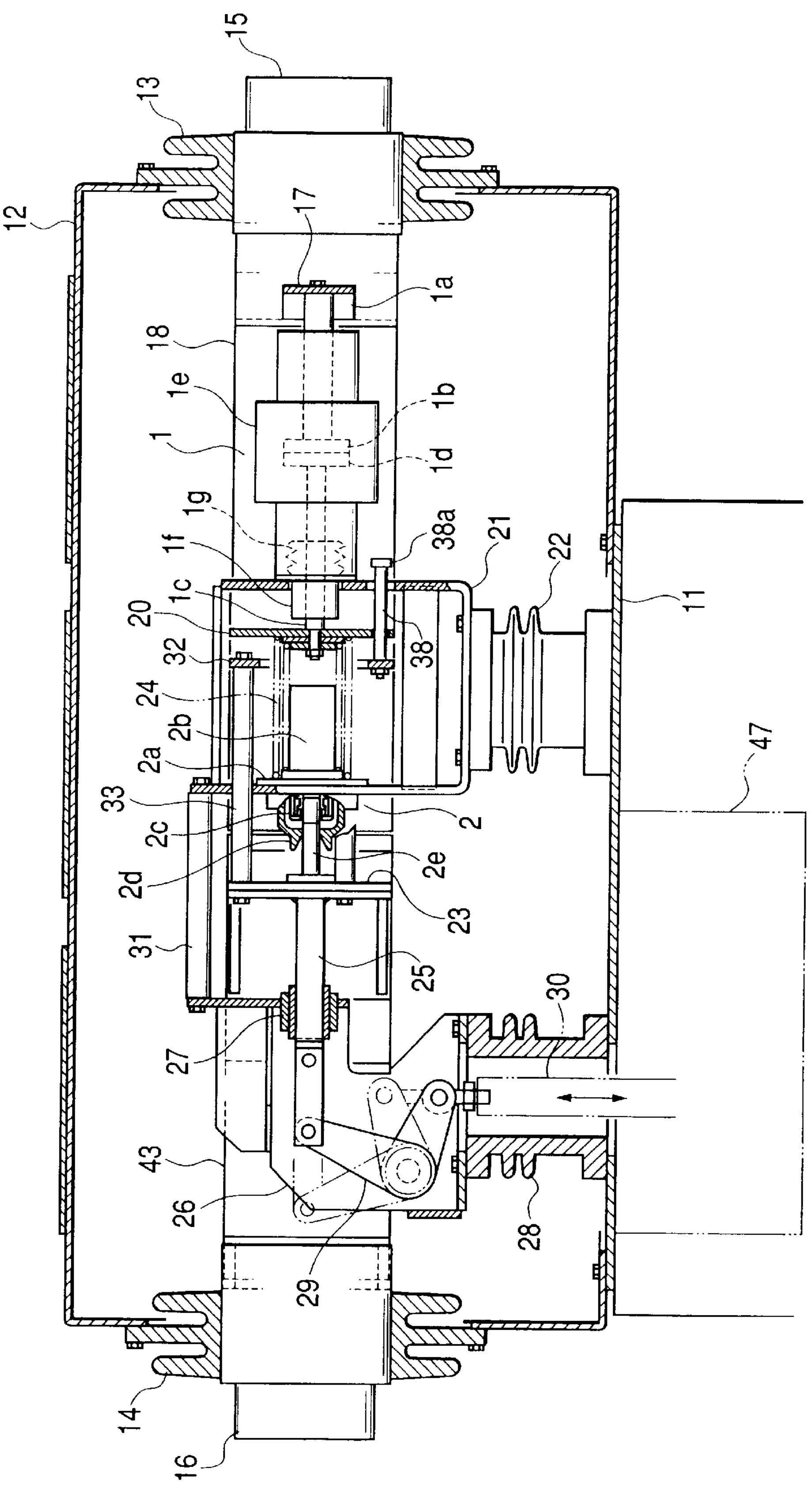
FIG. 3 is a vertically cross sectioned side view of a power use circuit breaker according to the present invention.
Figure 4:
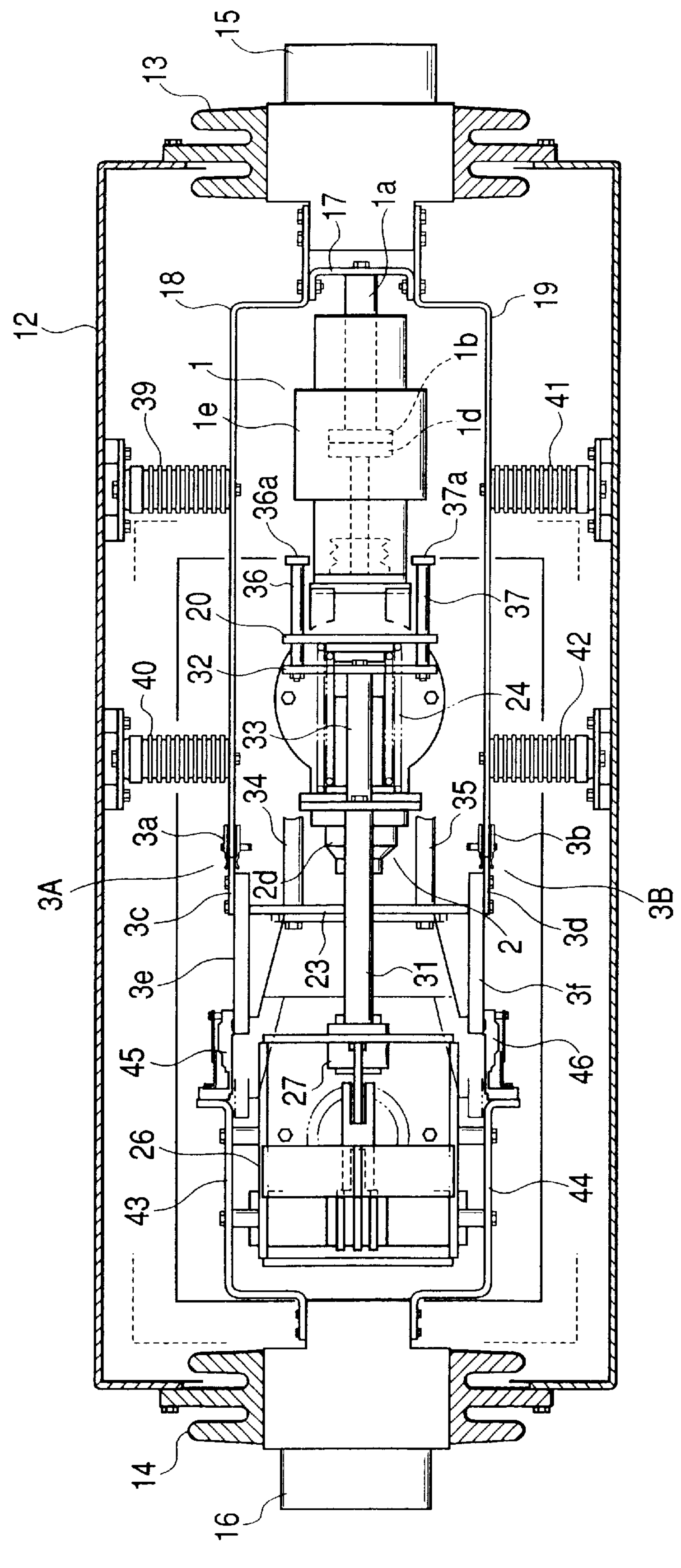
FIG. 4 is a laterally cross sectioned plane view of the power use circuit breaker as shown in FIG. 3.
Figure 5:
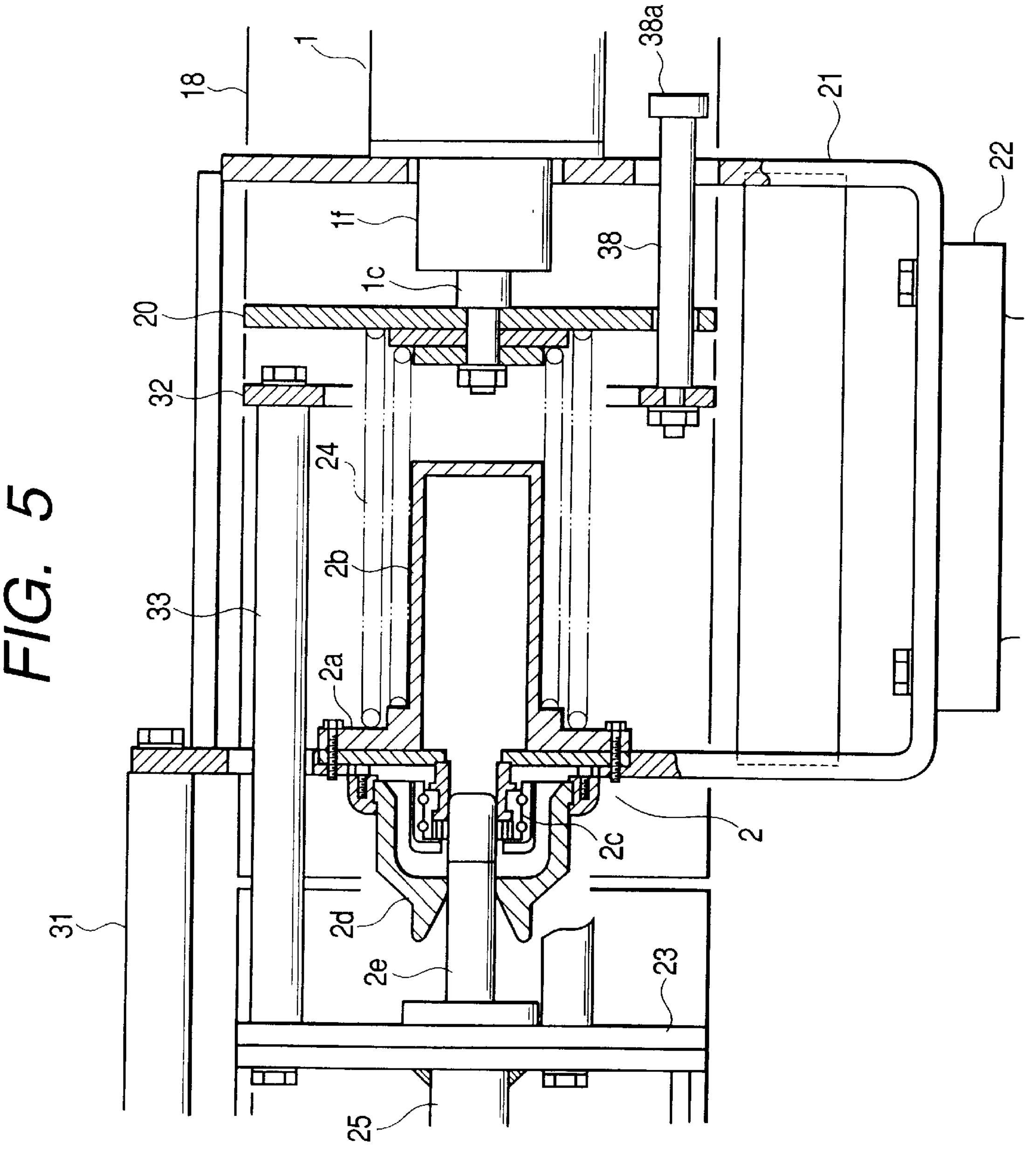
FIG. 5 is an enlarged cross sectional view of a portion of an arc generating switching unit in FIG. 3.
Figure 6:
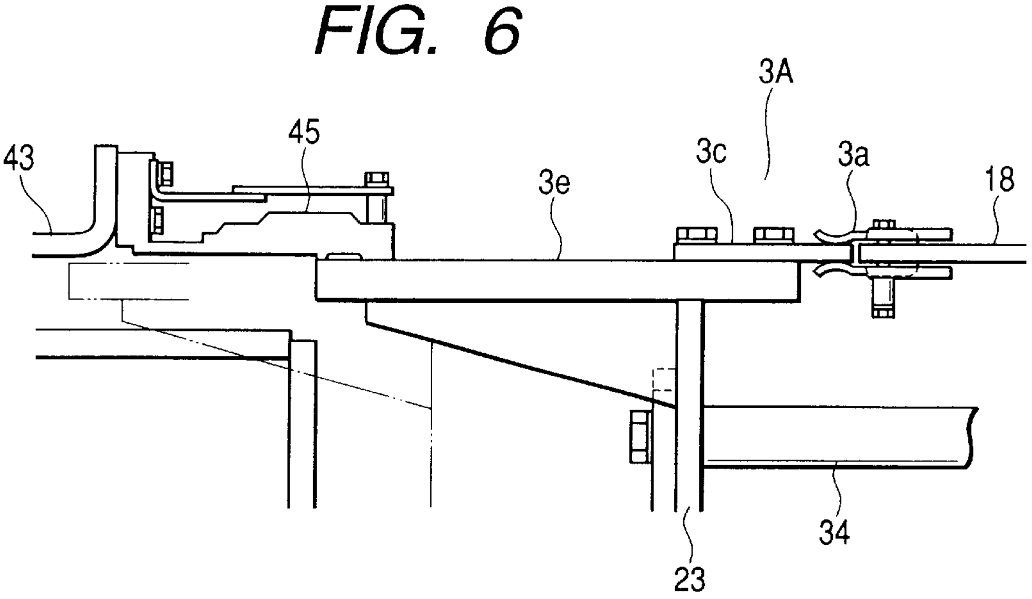
FIG. 6 is an enlarged plane view of a portion of a current conducting switching unit in FIG. 4.

FIG. 3 is a vertically cross sectioned side view of a power use circuit breaker provided with the above explained large current interrupting capacity according to the present invention and FIG. 4 is a laterally cross sectioned plane view thereof. Further, FIG. 5 is an enlarged cross sectional view of the arc generating switching unit 2 in FIG. 3, and FIG. 6 is an enlarged plane view of the current conducting switching unit 3 in FIG. 4.

The present power use circuit breaker is constituted in such a manner that the vacuum bulb 1, the arc generating switching unit 2 and the current conducting switching unit 3 (3A, 3B) are disposed between main circuit terminals 15 and 16 which are attached at both ends of an enclosed sheath 12 secured on a base plate 11 through respective supporting insulators 13 and 14 so that the main circuit terminals 15 and

16 pass through the respective ends, and through the main circuit terminals 15 and 16 the power use circuit breaker is connected to an external circuit.

In the vacuum bulb 1, a stationary contact 1*b* provided at an inner end of a conductive stationary rod 1*a* and a movable contact 1*d* provided at an inner end of a conductive movable rod 1*c* are disposed inside an insulative vacuum vessel 1*e*. The stationary rod 1*a* of the vacuum bulb 1 is led out while being passed through an end plate of the vacuum vessel 1*e* under a hermetically sealed condition, and the outer end thereof is fixed to a supporting conductor 17 through a screw, and further the supporting conductor 17 is connected to the main circuit terminal 15 through circuit conductor pieces 18 and 19 of the current conducting switching unit 3 (3A, 3B). On the other hand, the movable rod 1*c* is led out while being slidably passed through a sliding type current collector 1*f* provided at another end of the vacuum vessel 1*e* and the outer end thereof is attached to a coupling plate 20 through a screw. At the axially inner side of the sliding type current collector 1*f* a bellows is provided between the movable rod 1*c* and the other end plate so as to constitute a hermetically sealed structure. The sliding type current collector 1*f* is coupled to one of two legs of a U shaped supporting conductor 21 while passing therethrough and is secured thereto.

The supporting conductor 21 is attached at its bottom to the base plate 11 through a supporting insulator 22 and is secured thereto.

The arc generating switching unit 2 is attached at the other leg of the U shaped supporting conductor 21 through a screw while passing therethrough so as to assume a position concentric with the vacuum bulb 1.

The arc generating switching unit 2 is constituted in a like structure as that of a puffer type gas circuit breaker as illustrated in enlargement in FIG. 5. More specifically, the arc generating switching unit 2 is provided with a cylindrical thermo puffer container 2*b* with a bottom and having a flange 2*a* formed at the open end around the outer circumference thereof, a stationary side arc contact 2*c* attached to the flange 2*a* with a screw so as to position at the opening of the thermo puffer container 2*b*, an insulative puffer nozzle 2*d* likely secured to the flange 2*a* so as to surround the stationary side arc contact 2*c* and a movable side arc contact 2*e* which is attached to a conductive movable operation plate 23 so as to stand up therefrom and engages with and separates from the stationary side arc contact 2*c* by advancing and backing movement within the puffer nozzle 2*d* through the corresponding movement of the movable operation plate 23.

The electrical connection between the stationary side arc contact 2*c* in the arc generating switching unit 2 and the vacuum bulb 1 is realized through the U shaped supporting conductor 21.

Between the flange 2*a* of the thermo puffer container 2*b* and the coupling plate 20 a coil spring 24 is disposed around the cylindrical portion of the thermo puffer container 2*b* under compressed state so as to surround the outer circumference thereof, thereby, the movable rod 1*c* in the vacuum bulb 1 is pushed by the expansion force of the coil spring 24 so that the movable contact 1*d* contacts to the stationary contact 1*b*.

The movable operation plate 23 is secured at a top end of an operation rod 25. The operation rod 25 is movably supported by a sliding type bearing 27 provided at a bracket 26. The bracket 26 is supported by a hollow supporting insulator 28 secured on the base plate 11 under an insulated state. The bracket 26 rotatably supports an operation lever mechanism 29. The operation lever mechanism 29 is disposed between the operation rod 25 and an insulative drive portion coupled operation rod 30 which passes through within the hollow supporting insulator 28 and couples the both so as to move the operation rod 25 in advancing and backing directions through vertical movement of the drive portion coupled operation rod 30.

Between a top end portion of a leg of the U shaped supporting conductor 21 and the bracket 26 an insulative rod 31 is disposed so as to stabilized the position of the U shaped supporting conductor 21.

A ring shaped interconnecting plate 32 is attached to the movable operation plate 23 through vacuum bulb driving use insulative interconnecting rods 33, 34 and 35 so as to locate around the outer circumference of the coil spring 24, vacuum bulb driving rods 36, 37 and 38 which are secured to the ring shaped interconnecting plate 32 so as to stand up therefrom are passed through the coupling plate 20 under a clearance fitting, and at the other top ends of the vacuum bulb driving rods 36, 37 and 38 head portions 36*a*, 37*a* and 38*a* having a large diameter are formed. When the vacuum bulb driving rods 36, 37 and 38 are moved backward, the head portions 36*a*, 37*a* and 38*a* couple the coupling plate 20 to pull the same against the expansion force of the coil spring 24, thereby, the movable contact id in the vacuum bulb 1 is separated from the stationary contact 1*b*.

The current conducting switching unit circuit conductor pieces 18 and 19 which extend from the main circuit terminal 15 into the enclosed sheath 12 are supported by supporting insulators 39, 40, 41 and 42 on the enclosed sheath 12 so as to locate the same at both sides of the vacuum bulb 1 and the arc generating switching unit 2.

At the respective top ends of the current conducting switching unit conductor pieces 18 and 19 stationary contacts 3*a* and 3*b* of the current conducting switching units 3A and 3B are provided as illustrated in enlargement in FIG. 6. Movable contacts 3*c* and 3*d* of the current conducting switching units 3A and 3B are attached to respective side ends of movable conductive members 3*e* and 3*f* secured at respective side ends of the movable operation plate 23, thereby, the movable contacts 3*c* and 3*d* are moved through the movement of the movable members 3*e* and 3*f* together with the movement of the movable operation plate 23 so as to engage with and separate from the stationary contacts 3*a* and 3*b*. The current conducting switching units 3A and 3B are constituted in such a manner that under the circuit closed state where the movable contacts 3*c* and 3*d* are connected to the stationary contacts 3*a* and 3*d*, the units show a substantially negligible small resistance value.

Further, current conducting switching unit circuit conductor pieces 43 and 44 extending from the main circuit terminal 16 into the enclosed sheath 12 run along the respective sides of the bracket 26 and are supported by the bracket 26 so as to face the respective movable members 3*e* and 3*f*. At the respective top ends of the current conducting switching unit circuit conductor pieces 43 and 44 conductive stationary contacts 45 and 46 are provided which are designed to slidably contact with the movable members 3*e* and 3*f*.

Within the enclosed sheath 12 SF6 gas or nitrogen gas of about 1~2 atmospheric pressure is filled. Thus the gas is also filled in the thermo puffer container 2*b*.

The drive portion coupled operation rod 30 is driven by a drive device 47 disposed beneath the above base plate 11 so as not to break the hermetically sealed state. Although the detailed illustration and explanation of the drive device 47 is omitted, the drive device 47 is constituted by using a similar mechanism as a hydraulic pressure driven mechanism, an air pressure driven mechanism and a motor driven mechanism used in a common circuit breaker.

When placing the thus constituted power use circuit breaker under a current conducting condition, the drive portion coupled operation rod 30 is pulled down by the drive device 47 so as to rotate the operation lever 25 in clockwise direction to assume the condition indicated by the solid lines. Under this condition, since the operation rod 25 advances (movement in rightward in the drawing), the movable operation plate 23 likely advances, thereby, the interconnecting plate 32 attached to the movable operation plate 23 through the vacuum bulb driving use insulative interconnecting rods 33, 34 and 35 also advances to advance the vacuum bulb drive rods 36, 37 and 38, as a result, the coupling plate 20 is released from the head portions 36*a*, 37*a* and 38*a* of the vacuum bulb drive rods 36, 37 and 38, thus, the movable rod 1*c* is pushed by the coil spring 24 to contact the movable contact 1*d* to the stationary contact 1*b* and the vacuum bulb 1 assumes the circuit closed condition. Further, the arc generating switching unit 2 also assumes the circuit closed condition in such a manner that the movable side arc contact 2*e* advances while passing through the puffer nozzle 2*d* and contacts to the stationary side contact 2*c* through the movement of the movable operation plate 23. Still further, the current conducting switching units 3A and 3B also assume the circuit closed condition in such a manner that the movable contacts 3*c* and 3*d* advance and contact to the stationary contacts 3*a* and 3*c* through the movement of the movable operation plate 23.

Under such circuit closed condition of the vacuum bulb 1, the arc generating switching unit 2 and the current conducting switching units 3A and 3B, two parallel electrical passages are formed between the main circuit terminals 15 and 16, in that one is the current conducting circuit starting from the main circuit terminal 15 through the current conducting switching unit circuit conductor pieces 18 and 19, the current conducting switching units 3A and 3B, the stationary contacts 45 and 46 and the current conducting switching unit circuit conductor pieces 43 and 44 to the main circuit terminal 16, and the other is the interruption circuit starting from the main circuit terminal 15 through the current conducting switching unit circuit conductor pieces 18 and 19, the supporting conductor 17, the vacuum bulb 1, the U shaped supporting conductor 21, the arc generating switching unit 2, the movable operation plate 23, the movable members 3*e* and 3*f* and the stationary contacts 45 and 46 of the current conducting switching units 3A and 3B and the current conducting switching unit circuit conductor pieces 43 and 44 to the main circuit terminal 16. Under this condition, the current between the main circuit terminals 15 and 16 primarily flows through the current conducting circuit having sufficiently small electrical resistance.

When interrupting an accident current, the drive portion coupled operation rod 30 is pushed upward by the drive device 42 to rotate the operation lever 29 in anti-clockwise direction so as to assume the condition indicated by the chain lines. Under this condition, the operation rod 25 moves backward (movement in left ward direction in the drawing) to likely back the movable operation plate 23. When the movable operation plate 23 moves backward, the movable side arc contact 2*e* of the arc generating switching unit 2, the movable members 3*e* and 3*f* of the current conducting switching units 3A and 3B and the vacuum bulb drive rods 36, 37 and 38 likely move backward, and at first the movable contacts 3*c* and 3*d* of the current conducting switching units 3A and 3B separate from the stationary contacts 3*a* and 3*b*. Thereby, the current conducting circuit is placed in a circuit opened condition and the current primarily flowing through the current conducting circuit is transferred into the interruption circuit including the vacuum bulb 1 and the arc generating switching unit 2.

Subsequently, when the movable side arc contact 2*e* moving backward in the puffer nozzle 2*d* is separated from the stationary side arc contact 2*c*, an arc is generated between the movable side arc contact 2*e* and the stationary side arc contact 2*c*. Thus generated arc acts as a resistor for attenuating the fault current in particular a DC current component thereof. Further, the heat generated by the arc heats the gas within the thermo puffer container 2*b* to thermally expand the gas and to increase the pressure thereof for blasting the same onto the arc.

When the movable operation plate 23 moves further backward, the head portions 36*a*, 36*a* and 37*a* of the vacuum bulb drive rods 36, 37 and 38 couple with the coupling plate 20 to pull the same, thereby, the movable rod 1*c* of the vacuum bulb 1 moves backward against the expansion force of the coil spring 24 to separate the movable contact 1*d* from the stationary contact 1*b*, thus, the fault current of which magnitude is attenuated by the electrical resistance due to the arc is interrupted.

With regard to such timings of the current interrupting operation, the timing after opening the current conducting switching unit 3 until opening the arc generating switching unit 2 is set by the difference between the sliding stroke amount of the stationary contacts 3*a* and 3*b* and the movable contacts 3*c* and 3*d* of the current conducting switching unit 3 under their contacting state and the sliding stroke amount of the stationary side arc contact 2*c* and the movable side arc contact 2*d* of the arc generating switching unit 2 under their contacting state, and the timing after opening the arc generating switching unit 2 until opening the vacuum bulb 1 is set by the dead band stroke amount (the range through which an input can be varied without initiating a response, i.e., $t_1+t_2$ in FIG. 2) in the operation mechanism after opening the arc generating switching unit 2 until the head portions 36*a*, 37*a* and 38*a* of the vacuum bulb drive rods 36, 37 and 38 couple with the coupling plate 20. Thus, the vacuum bulb 1, the arc generating switching unit 2 and the current conducting switching unit 3 are interlocked and their switching operation is performed by a single drive device 47.

Such power use circuit breaker is suitably applied for interrupting a low voltage large current by connecting the same in an electric power generator main circuit between an electric power generator and a main power transformer in an electric power generation plant.

Figure 7:
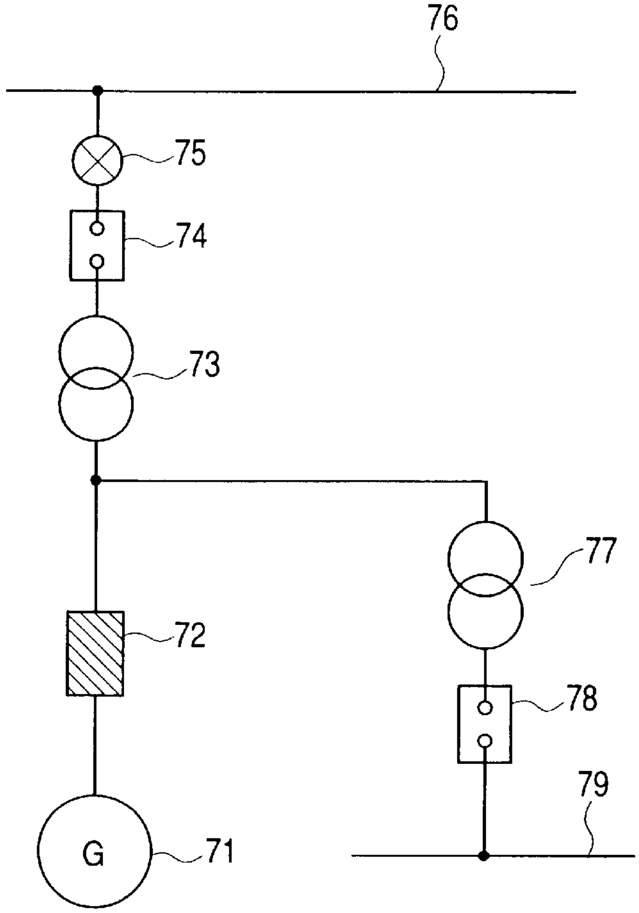
FIG. 7 is an electric circuit diagram representing an embodiment showing wirings of electrical machines and apparatus in an electric power generation plant where the power use circuit breaker according to the present invention is installed.

FIG. 7 is an electric circuit diagram representing an embodiment showing wirings of electrical machines and apparatus in an electric power generation plant where the power use circuit breaker according to the present invention is installed. An electric power generator 71 is connected through an electric power generation main circuit use circuit breaker 72 employing the power use circuit breaker according to the present invention, a main power transformer 73, another circuit breaker 74 and a disconnecting switch 75 in this order to an electric power transmission line 76. A house power source is received from the electric power generation main circuit at between the electric power generation main circuit use circuit breaker 72 and the main power transformer 73 and is supplied through a house transformer 77 and still another circuit breaker 78 in this order to a house power distribution line 79.

The electric power generation main circuit use circuit breaker 72 is operated, when the electric power generator 71 is stopped, started and failed. Namely, when the electric power generator 71 is stopped or failed, the electric power generation main circuit use circuit breaker 72 opens the circuit and interrupts a load or fault current, and when starting, the electric power generation main circuit use circuit breaker 72 closes the circuit when the rotating speed of the electric power generator 71 reaches a predetermined level.

With the use of such electric power generation main circuit use circuit breaker 72, the size of the installation for the electric power generation plant can be reduced.

Further, the present power use circuit breaker can be used by connecting in series between a generator-motor and a main power transformer in a pumping-up electric power generation plant.

According to the power use circuit breaker of the present invention, the size of the power use circuit breaker which performs conduction and interruption of a large current containing a DC component can be reduced.

Further, according to the power use circuit breaker of the present invention, a small sized power use circuit breaker which surely interrupts a large current containing a DC component with a small operating force can be realized.

Still further, according to the present invention, an electric power generation plant electric circuit arrangement of which house installation size is reduced through the use of a small sized power use circuit breaker can be realized.

What is claimed is:

1. A power use circuit breaker including a current interrupting circuit which is connected in an electric circuit and operates to interrupt current flowing through the electric circuit and a current conducting circuit which is connected in parallel with the current interrupting circuit during interruption of the current so as to transfer conducting current to the current interrupting circuit, wherein:

the current interrupting circuit is provided with an electrical resistance generating unit which adds an electrical resistance in the electric circuit during interruption of the current and attenuates the current to be interrupted and a vacuum circuit breaker which is connected in series with the electrical resistance generating unit and operates to interrupt the attenuated current;

wherein the electrical resistance generating unit is an arc generating switching unit which is closed during current conduction to have a substantially negligible small value of electrical resistance and is opened during current interruption so as to generate an arc and to form an arc resistance circuit; and wherein the current conducting circuit is provided with a current conducting switching unit, and the vacuum circuit breaker and the current conducting switching unit are coupled through an operating mechanism having a dead band with regard to operation stroke so as to open the vacuum circuit breaker after having opened the current conducting switching unit which permits an interlocked switching operation of the current conducting switching unit and the vacuum circuit breaker with a single driving unit.

2. A power use circuit breaker, which is connected in an electric circuit and operates to interrupt current flowing through the electric circuit comprising:

an electrical resistance generating unit which adds an electrical resistance in the electric circuit during interruption of current and attenuates the current to be interrupted and a vacuum circuit breaker which is connected in series with the electrical resistance generating unit and operates to interrupt the attenuated current;

wherein the electrical resistance generating unit is an arc generating switching unit which is closed during current conduction to have a substantially negligible small value of electrical resistance and is opened during current interruption so as to generate an arc and to form an arc resistance circuit; and wherein the vacuum circuit breaker and the arc generating switching unit are coupled through an operating mechanism having a dead band with regard to operation stroke so as to open the arc generating switching unit to generate an arc and thereafter to open the vacuum circuit breaker which permits an interlocked switching operation of the arc generating switching unit and the vacuum circuit breaker with a single driving unit.

3. A power use circuit breaker, including a current interrupting circuit which is connected in an electric circuit and operates to interrupt current flowing through the electric circuit and a current conducting circuit which is connected in parallel with the current interrupting circuit during interruption of the current so as to transfer conducting current to the current interrupting circuit, wherein:

the current interrupting circuit is provided with an electrical resistance generating unit which adds an electrical resistance in the electric circuit during interruption of the current and attenuates the current to be interrupted and a vacuum circuit breaker which is connected in series with the electrical resistance generating unit and operates to interrupt the attenuated current;

wherein the electrical resistance generating unit is an arc generating switching unit which is closed during current conduction to have a substantially negligible small value of electrical resistance and is opened during current interruption so as to generate an arc and to form an arc resistance circuit; and wherein the current conducting circuit is provided with a current conducting switching unit, and the vacuum circuit breaker, the arc generating switching unit and the current conducting switching unit are coupled through an operating mechanism having a dead band with regard to operation stroke so as to open the arc generating switching unit to generate an arc after having opened the current conducting switching unit and thereafter to open the vacuum circuit breaker which permits an interlocked switching operation of the current conducting switching unit, the arc generating switching unit and the vacuum circuit breaker with a single driving unit.

4. A power use circuit breaker according to claim 3 wherein the current conducting switching unit and the arc generating switching unit are interlocked like a unitary body.

5. A power use circuit breaker comprising:

a first and a second main terminal conductor;

a pair of current carrying conductor bars running in parallel each other between said first an second main terminal conductors, each conductor bar including a first conductor bar piece electrically connected to said first main terminal conductor, a second conductor bar piece connected to said second main terminal conductor and a bridging conductor bar piece disposed between said first and second conductor bar pieces so as to connect and disconnect between said first and second conductor bar pieces;

a vacuum bulb disposed between said pair of current carrying conductor bars and a stationary rod of said vacuum bulb electrically connected to said first main terminal conductor via said first conductor bar piece;

an arc generating switching unit disposed between said pair of first and second main terminal conductors, said arc generating switching unit including a cylindrical thermo puffer container having a bottom and a flange at the open end and around the outer circumference thereof, a stationary arc contact attached to the flange so as to surround the opening of said cylindrical thermo puffer container, an insulative puffer nozzle attached to the flange so as to surround said stationary arc contact and a movable arc contact which is movable with respect to said stationary arc contact;

a movable operation plate carrying said bridging conductor bar pieces and said movable arc contact;

a U shaped supporting conductor supporting said vacuum bulb at one leg thereof and said arc generating switching unit at another leg thereof and electrically connecting a movable rod of said vacuum bulb and said stationary arc contact of said arc generating switching unit;

a coupling plate disposed between said two legs of said U shaped supporting conductor and secured to an outer end of said movable rod of said vacuum bulb;

a coil spring disposed between said flange of said cylindrical thermo puffer container of said arc generating switching unit and said coupling plate so as to urge said movable rod toward said stationary rod in said vacuum bulb;

an operation lever mechanism connected to said movable operation plate; and a coupling mechanism which couples said movable operation plate with said coupling plate with a predetermined dead band.

* * * * *